United States Patent [19]
Murakami et al.

[11] Patent Number: 5,011,304
[45] Date of Patent: Apr. 30, 1991

[54] ROLLING BEARING

[75] Inventors: Yasuo Murakami; Yoichi Matsumoto; Shinjiro Ishii, all of Fujisawa; Ryurou Kurahashi; Mitsuru Nakamura, both of Muroran, all of Japan

[73] Assignee: Nippon Seiko Kabushiki Kaisha, Tokyo, Japan

[21] Appl. No.: 555,240

[22] Filed: Jul. 19, 1990

[30] Foreign Application Priority Data

Jul. 21, 1989 [JP] Japan ................... 1-187561

[51] Int. Cl.$^5$ .............................. F16C 19/00
[52] U.S. Cl. ................... 384/492; 384/912; 384/913
[58] Field of Search ............ 384/492, 912, 913, 548, 384/615, 907

[56] References Cited

U.S. PATENT DOCUMENTS 4,904,094 2/1990 Furumura et al. ................ 384/492

FOREIGN PATENT DOCUMENTS 51-47421 12/1976 Japan .
62-131705 8/1987 Japan .
63-62847 3/1988 Japan .

Primary Examiner—Lenard A. Footland
Attorney, Agent, or Firm—Basile and Hanlon

[57] ABSTRACT

A rolling bearing, in which at least one of the races and a rolling element of the rolling bearing is made of a raw steel which is free from a $Al_2O_3$ or an $Al_2O_3$-base inclusion particle with a 13 μm or more average particle size; but which includes 80 or less $Al_2O_3$ or $Al_2O_3$-base inclusion particles with a 3 μm or more average particle size for each tested area of 165 mm$^2$. The rolling bearing provides a very long life rolling bearing even under the severe conditions of a high bearing, the presence of a deflection in a bearing housing, defective lubrication, etc.

16 Claims, 6 Drawing Sheets

ROLLING BEARING

BACKGROUND OF THE INVENTION

1. Field of the Invention

The present invention relates to a rolling bearing having a very long life and, more particularly, to a rolling bearing having a very long life even under the severe conditions of high bearing loads, the presence of a deflection in a bearing housing, defective lubrication, etc.

2. Description of the Related Art

Recently, a situation involving the use of a bearing has become severe.

For example, the diameter of a minor diameter side working roll of a rolling mill described in Examined Japanese patent application publication No. SHO 51-47421 was reduced in order to provide a good profile in a produced steel sheet. Accordingly, the number of revolutions of the minor diameter side working roll was increased in order to roll steel material of the same weight as by a conventional rolling mill. In addition, since the diameter of a working roll 1 (see FIG. 6) of a rolling mill designed for low-temperature, high-pressure rolling or high profile control and described in Unexamined Japanese utility model application publication No. SHO 62-131705 has been more reduced, a rolling bearing used with the working roll 1 is smaller and receives a higher bearing load, and the number of revolutions of the working roll 1 is increased. In addition, since the working roll trunk receives a horizontal bending force, deflections in the working roll necks are increased. Thus, a long life rolling bearing even under such severe conditions has been desired.

Increasing the rolling contact fatigue resistance of the rolling bearing is important in increasing the life of the rolling bearing. It is known that the rolling contact fatigue resistance of the rolling bearing depends largely on an $Al_2O_3$ inclusion or an $Al_2O_3$-base inclusion in the raw steel for the rolling bearing. The $Al_2O_3$ or $Al_2O_3$-base inclusion present in raw steel for rolling bearings provides an origin for a fatigue failure of a rolling bearing which receives a repeated stress. Therefore, the prior art has intended to control the content of a large $Al_2O_3$ or $Al_2O_3$-base inclusion to be 1.5 ppm or less in order to increase the rolling fatigue life of a rolling bearing as described in Unexamined Japanese patent application publication No. SHO 63-62847.

However, a study by the present inventors taught that simply controlling the upper limit of the content of the large $Al_2O_3$ or $Al_2O_3$-base inclusion insufficiently provided a long life rolling bearing; but controlling an allowable particle size of large $Al_2O_3$ or $Al_2O_3$-base inclusion particles and an allowable number thereof was important in increasing the rolling fatigue resistance of a rolling bearing.

SUMMARY OF THE INVENTION

An object of the present invention is to control an allowable particle size of large $Al_2O_3$ or $Al_2O_3$-base inclusion particles present in raw steel and an allowable number of such particles and to thereby provide a long life rolling bearing even under the severe conditions of the presence of a deflection in roll necks, etc., defective lubrication and high bearing loads.

A first aspect of the present invention provides a rolling bearing wherein at least one of the races and the rolling element of the rolling bearing is made from a raw steel which is free from a $Al_2O_3$ or $Al_2O_3$-base inclusion particle of 13 μm or more average particle size, but which includes 80 or less $Al_2O_3$ or $Al_2O_3$-base inclusion particles with a 3 μm or more particle size for each tested area of 165 mm² of one part of the rolling bearing.

A second aspect of the present invention provides a rolling bearing according to the first aspect of the present invention wherein the raw steel has a composition of impurities comprising P: 0.020 wt % or less; S: 0.008 wt % or less; and Ti: 0.004 wt % or less.

A third aspect of the present invention provides a rolling bearing according to the first or second aspect of the present invention wherein the content of retained austenite present in the surface of the one of the races and the rolling element of the rolling bearing is 20–45 vol %.

A fourth aspect of the present invention provides a rolling bearing according to one of the first, second or third aspects of the present invention which is used with a hot-rolling working roll having a 400 mm or less diameter.

A fifth aspect of the present invention provides a rolling bearing according to one of the first to fourth aspects of the present invention which is used with a hot-rolling working roll so that a horizontal bending apparatus applies a horizontal bending to the trunk of the hot-rolling working roll.

DESCRIPTION OF THE INVENTION

The present invention will be described in detail hereinafter. A rolling bearing of the present invention is characterized in that at least one of the races and the rolling element of the rolling bearing is made of a raw steel complying with the following inclusion requirement, impurity requirement and in-surface retained austenite content requirement:

(1) Inclusion Requirement

For each 165 mm² tested area of raw material, the number of $Al_2O_3$ or $Al_2O_3$-base inclusion particles with a 13 μm or more average particle size is zero and, on the other hand, the number of $Al_2O_3$ or $Al_2O_3$-base inclusion particles with a 3 μm or more average particle size should be 80 or less.

(2) Impurity Requirement

The composition of impurities should be that P is 0.020 wt % or less, S is 0.008 wt % or less, and Ti is 0.004 wt % or less.

(3) In-surface Retained Austenite Content Requirement

The content of retained austenite present in the track surface of the races or the rolling contact surface of the rolling element should be 20–45 vol %.

The significancies of the above requirements will be described hereafter.

(1) Inclusion Requirement

The present inventors conducted various tests for a relationship between an inclusion particle and a rolling fatigue life and established the subject inclusion requirement.

Figure 1:
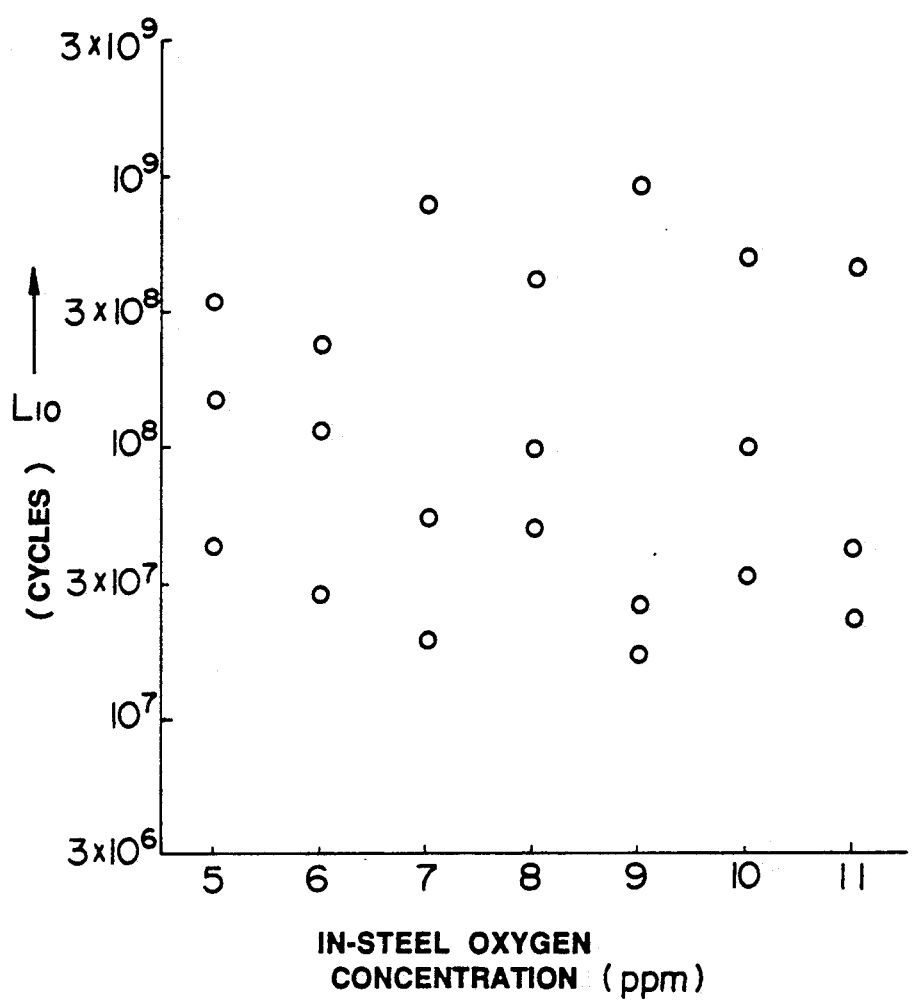
FIG. 1 is a graph illustrating one example of a relationship between a rated life $L_{10}$ (i.e., 90% survivable life and an in-steel oxygen concentration.

First, they tested for a relationship between an in-steel oxygen concentration in ppm reflecting the total of an in-steel oxidic inclusion and a rated rolling fatigue life $L_{10}$ in cycles (i.e., 90% survivable rolling fatigue life). FIG. 1 represents one example of this relationship. They could discover no correlation between the in-steel oxygen concentration and $L_{10}$. That is, in the range of such low oxygen concentration, in-steel oxygen concentration would not determine $L_{10}$.

Figure 2:
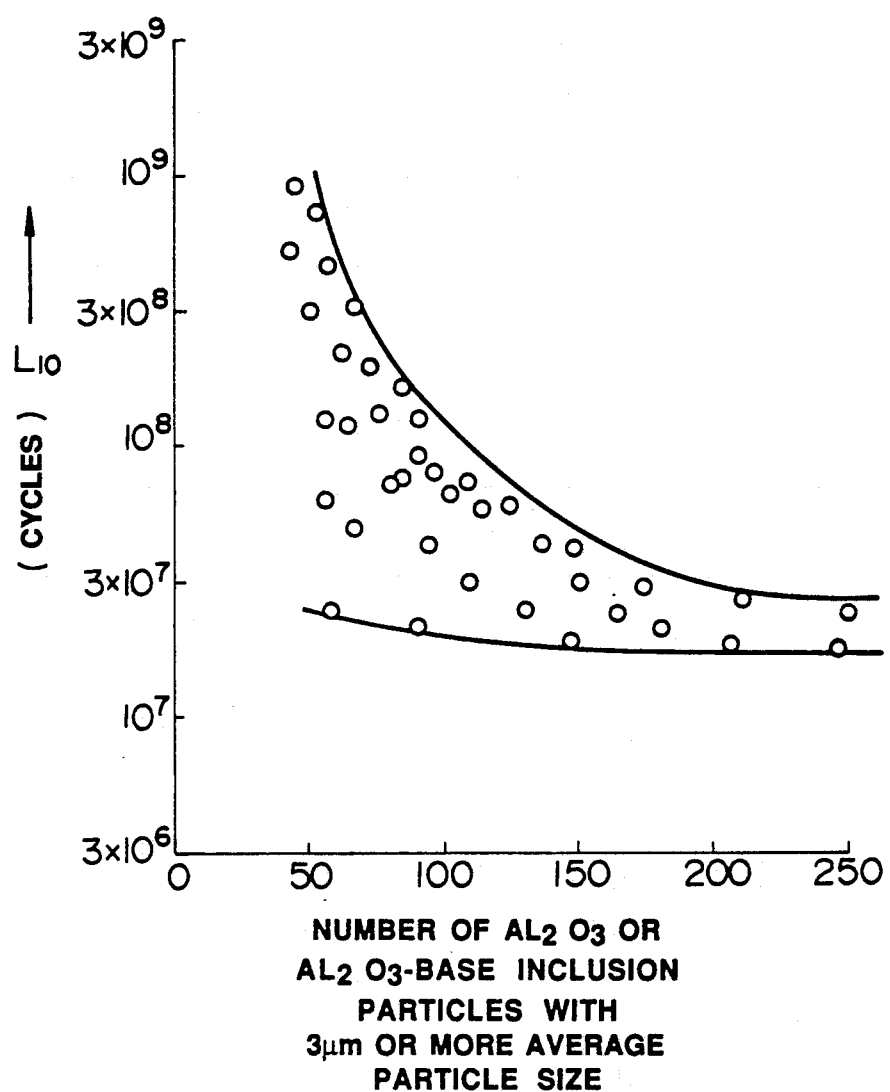
FIG. 2 is a graph illustrating one example of a relationship between rated life $L_{10}$ and the number of $Al_2O_3$ or $Al_2O_3$-base inclusion particles with a 3 μm or more average particle size for each tested area of 165 mm² of a raw steel.

Then, they tested for a relationship between the number of $Al_2O_3$ or $Al_2O_3$-base inclusion particles with a 3 μm or more average particle size and $L_{10}$. FIG. 2 represents one example of this relationship. As the number of $Al_2O_3$ or $Al_2O_3$-base inclusion particles with a 3 μm or more average particle size was increased, $L_{10}$ was decreased and dispersion in this relationship was low. Thus, the number of $Al_2O_3$ or $Al_2O_3$-base inclusion particles with a 3 μm or more average particle size high accurately determines $L_{10}$. However, when this number was small, $L_{10}$ differed variously between short and long so that this number would not determine $L_{10}$ by itself.

Figure 3:
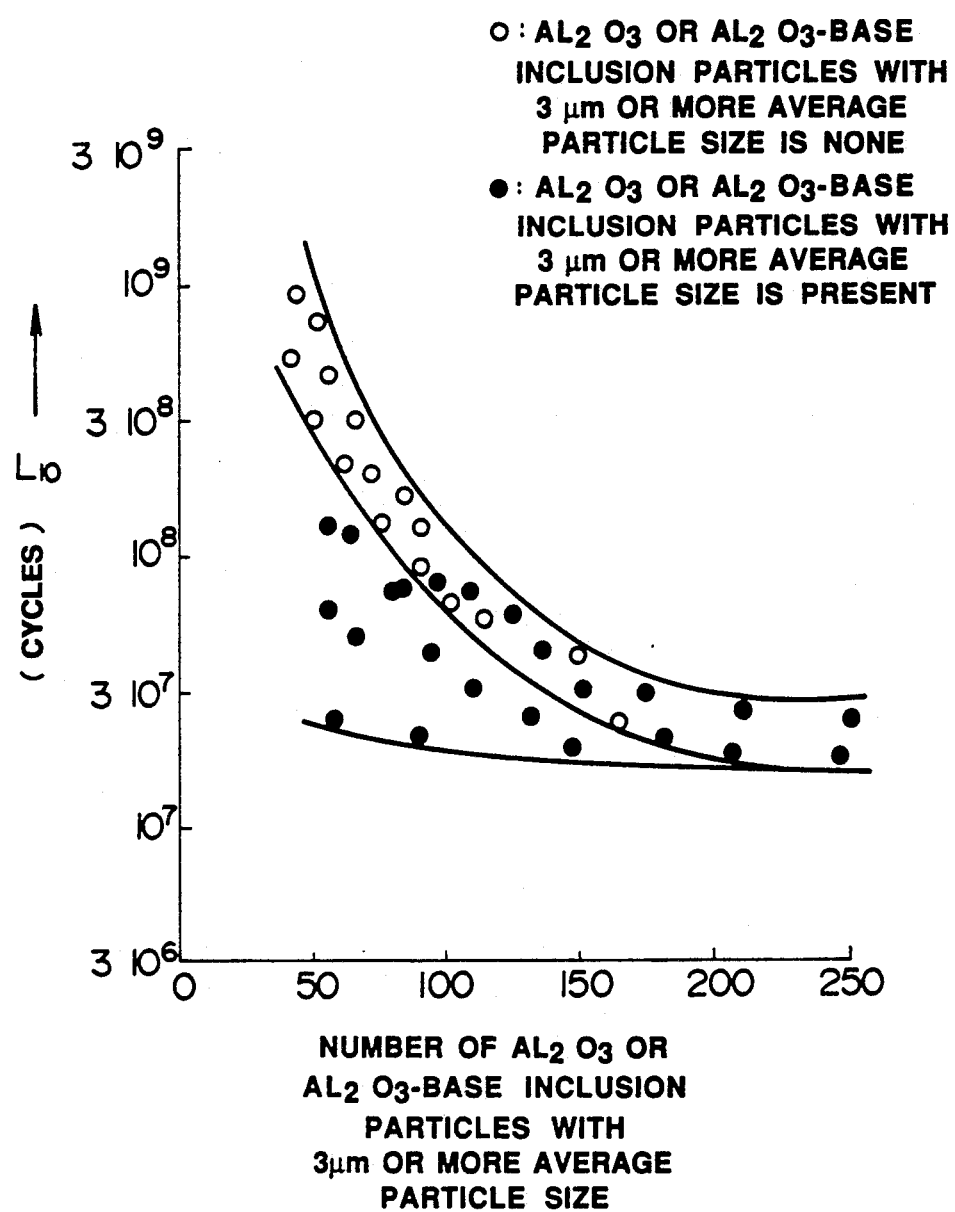
FIG. 3 is a graph illustrating relationships between rated lives $L_{10}$ and the numbers of $Al_2O_3$ or $Al_2O_3$-base inclusion particles with a 3 μm or more average particle size for each tested area of 165 mm² of the raw steel in the presence and absence of an $Al_2O_3$ or $Al_2O_3$-base inclusion particle with a 13 μm or more average particle size, in which graph plots of FIG. 2 representing the presence of the $Al_2O_3$ or $Al_2O_3$-base inclusion particle with a 13 μm or more average particle size are changed to black.

FIG. 3 is a graph illustrating relationships between $L_{10}$ and the numbers of $Al_2O_3$ or $Al_2O_3$-base inclusion particles with a 3 μm or more average particle size, in which graph plots of FIG. 2 representing the presence of $Al_2O_3$ or $Al_2O_3$-base inclusion particle with a 13 μm particle size are changed to black. White plots in FIG. 3 indicate a good correlation between $L_{10}$ and the number of $Al_2O_3$ or $Al_2O_3$-base inclusion particles with a 3 μm or more average particle size throughout the test range. Thus, as is apparent from FIG. 3, when each tested area of 165 mm² of raw steel had no $Al_2O_3$ or $Al_2O_3$-base inclusion particle with a 13 μm average particle size, the number of $Al_2O_3$ or $Al_2O_3$-base inclusion particles with a 3 μm or more average particle size accurately determined the rated rolling bearing life $L_{10}$. On the other hand, when each tested area of 165 mm² of raw steel had $Al_2O_3$ or $Al_2O_3$-base inclusion particle with a 13 μm average particle size, the $L_{10}$ lives were shorter. In order to obtain $L_{10}$ of 30 more times, a calculated rolling bearing life $L_{10}cal$ ($=2.8 \times 10^6$ cycles) the present inventors established the requirement that for each tested area of 165 mm² of raw steel, the number of $Al_2O_3$ or $Al_2O_3$-base inclusion particles with a 13 μm or more average particle size was zero and, on the other hand, the number of $Al_2O_3$ or $Al_2O_3$-base inclusion particles with a 3 μm or more average particle size had to be 80 or less.

In order to reduce the number of Al=0or $Al_2O_3$-base inclusion particles with a 13 μm or more average particle size for each tested area of 165 mm² of raw steel to zero, vacuum double melting process comprising a VIM (i.e., vacuum induction melting) step and then a VAR (i.e., vacuum arc remelting) step were effectively employed.

The life tests of FIGS. 1–3 were conducted on disc-shaped test pieces by means of a tester described on pages 10–21 of "Special Steel Manual, 1st edition" edited by Electrosteelmaking Research Institute and published by Rikohgakusha on May 25, 1965.

Conditions of the FIGS. 1–3 tests are as follows:

$P_{max} = 527$ kgf/mm², $N = 3,000$ c.p.m., and Lubricating oil: VG 68 turbine oil.

(2) Impurity Requirement

P: 0.020 wt % or less.

Since P reduces the tenacity of raw steel, the content of P is as low as possible. Thus, the upper limit of the content of P was 0.020 wt %.

S: 0.008 wt % or less.

S causes the generation of a sulfide or sulfide-base inclusion, e.g., MnS.

MnS, which has a low hardness and high plasticity, provides the origin of a crack in a preworking, e.g., rolling and forging, of raw steel. Thus, in order to prevent the occurrence of the crack in the preworking of raw steel and to allow a harder working of raw steel, the content of S should be reduced. Thus, the upper limit of the content of S was 0.008 wt %.

Ti: 0.004 wt % or less.

Ti appears in the form of TiN in raw steel.

TiN, which has a high hardness and low plasticity, causes a stress concentration and decreases rolling bearing life, so that the content of Ti should be reduced as much as possible. Thus, the upper limit of the content of Ti was 0.004 wt %.

(3) In-surface Retained Austenite Content Requirement

The present inventors previously confirmed that there was a range of in-surface retained austenite content ($r_R$) optimum for the rolling life $L_{10}$ and the median rolling fatigue life $L_{50}$ (see Unexamined Japanese patent application publication No. SHO 64-55423). That is, when the content of in-surface retained austenite content ($r_R$) was 20 vol % or more, both $L_{10}$ and $L_{50}$ were increased. However, when the content of in-surface retained austenite content ($r_R$) was 40 vol % and, particularly, exceeded 45 vol %, rolling fatigue life was abruptly decreased. Thus, in-surface retained austenite content ($r_R$) (i.e., retained austenite content ($r_R$) in the surface of at least one of the races and the rolling element of rolling bearing) should range between at least 20–45 vol %.

Carburizing or carbonitriding at least one of the races and the rolling element of the rolling bearing as described in, for example, Unexamined Japanese patent application publication No. SHO 64-55423, causes in-surface retained austenite content ($r_R$) to be 20–45%.

DESCRIPTION OF THE PREFERRED EMBODIMENTS

The preferred embodiments of the present invention will be described hereinafter.

Embodiment 1

Figure 4:
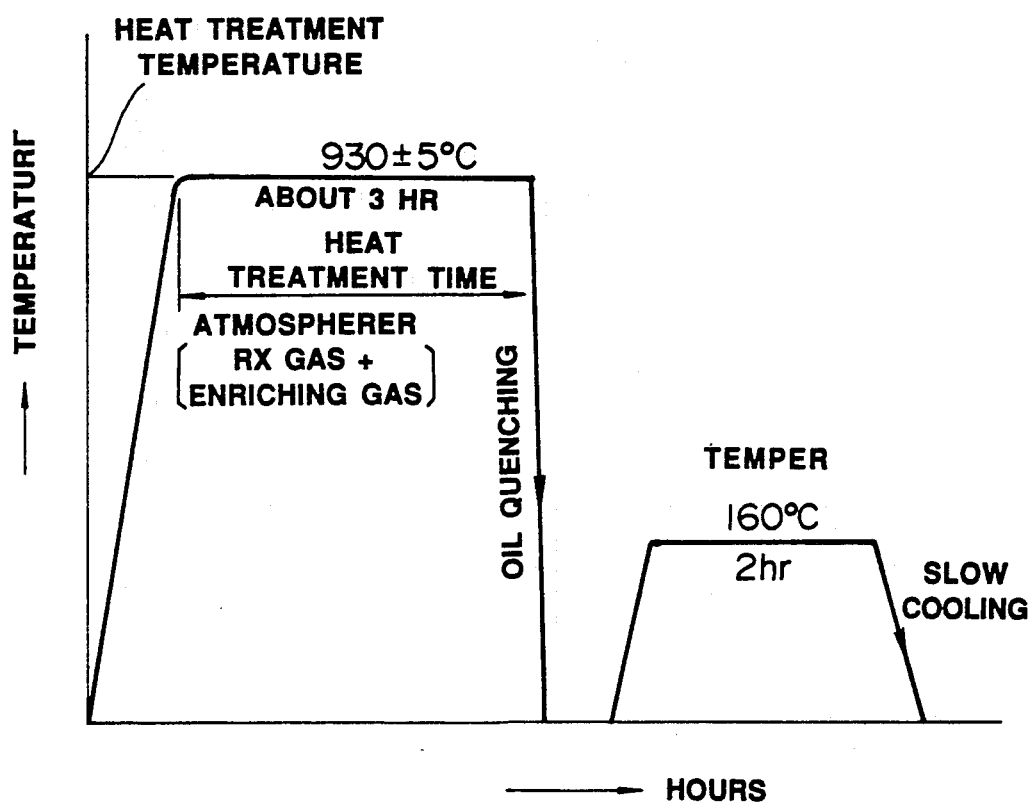
FIG. 4 is a graph illustrating a relationship between temperature and time of heat treatment test pieces of a first embodiment of the present invention.

Five charges of inventive raw steel were produced in the sequence of VIM and VAR of the vacuum double melting process. On the other hand, five charges of prior-art raw steel were produced in the sequence of normal EF (i.e., electric furnace), LF (i.e., one kind of ladle refining) and RH (i.e., one kind of vacuum degassing). Disc-shaped test pieces were made of the inventive and prior-art raw steels and tested for life. FIG. 1 shows the number of $Al_2O_3$ or $Al_2O_3$-base inclusion particles with a 3 μm or more average particle size, the presence or absence of $Al_2O_3$ or $Al_2O_3$-base inclusion particle with a 13 μm or more average particle size, the chemical composition of each raw steel, the in-surface retained austenite content ($r_R$) vol %, and the rated life $L_{10}$ of the disc-shaped test pieces made of each raw steel. FIG. 4 illustrates a processing of a carburization, quenching and temper process in which the disc-shaped test pieces were carburized under the atmosphere of an RX gas plus an enriching gas at about 930° C.+5° C. for about three hours, then oil quenched and, finally, tempered at 160° C. for two hours. A life test for each disc-shaped test piece was conducted by means of the tester described on pages 10-21 of "Special Steel Manual, 1st edition" edited by Electrosteelmaking Research Institute and published by Rikohgakusha on May 25, 1965. Conditions of the life test were as follows:

$P_{max}$=527 kgf/mm$^2$, N=3,000 c.p.m. and Lubricating oil: VG 68 turbine oil.

Figure 6:
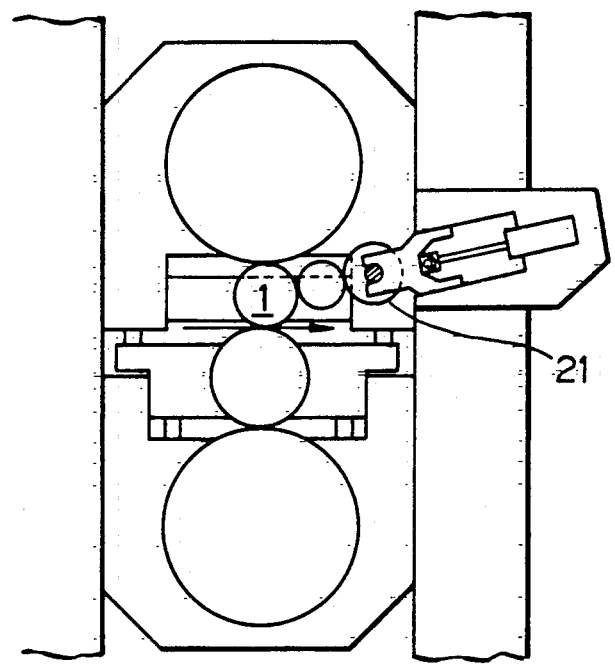
FIG. 6 is a schematic side elevational view of a rolling mill disclosed in Unexamined Japanese utility model application publication No. SHO 62-131705.

Disc-shaped test pieces of charges 1-3 comply with all of the features of the present invention and have long lives far beyond 30 times calculated life $L_{10}$cal (=2.8×10$^6$ cycles). Disc-shaped test pieces of charges 4 and 5 comply with the features of the present invention; but fail to comply with the in-surface retained austenite content requirement, so that the lives of the disc-shaped test pieces of charges 4 and 5 are reduced so as not to exceed 30 times the calculated life $L_{10}$cal. Disc-shaped test pieces of charges 6-10, which fail to have the required minimum and maximum $Al_2O_3$ or $Al_2O_3$-base inclusion particle sizes, have reduced lives $L_{10}$ far under 30 times the calculated life $L_{10}$cal.

bearing with a 180 mm bore diameter, a 254 mm outside diameter and a 185 mm bearing width, a double row tapered roller bearing with a 130 mm bore diameter, a 250 mm outside diameter and a 120 mm bearing width, and a four row cylindrical roller bearing with a 150 mm bore diameter, a 348 mm outside diameter and a 408 mm bearing width which had been made of the remainder of this raw steel were respectively employed as a bearing for a roll neck of an upper working roll 1 and a bearing for a support roll 21 of a rolling mill disclosed in Unexamined Japanese utility model application publication No. SHO 62-131705. FIG. 6 illustrates the arrangement of this rolling mill.

Figure 5:
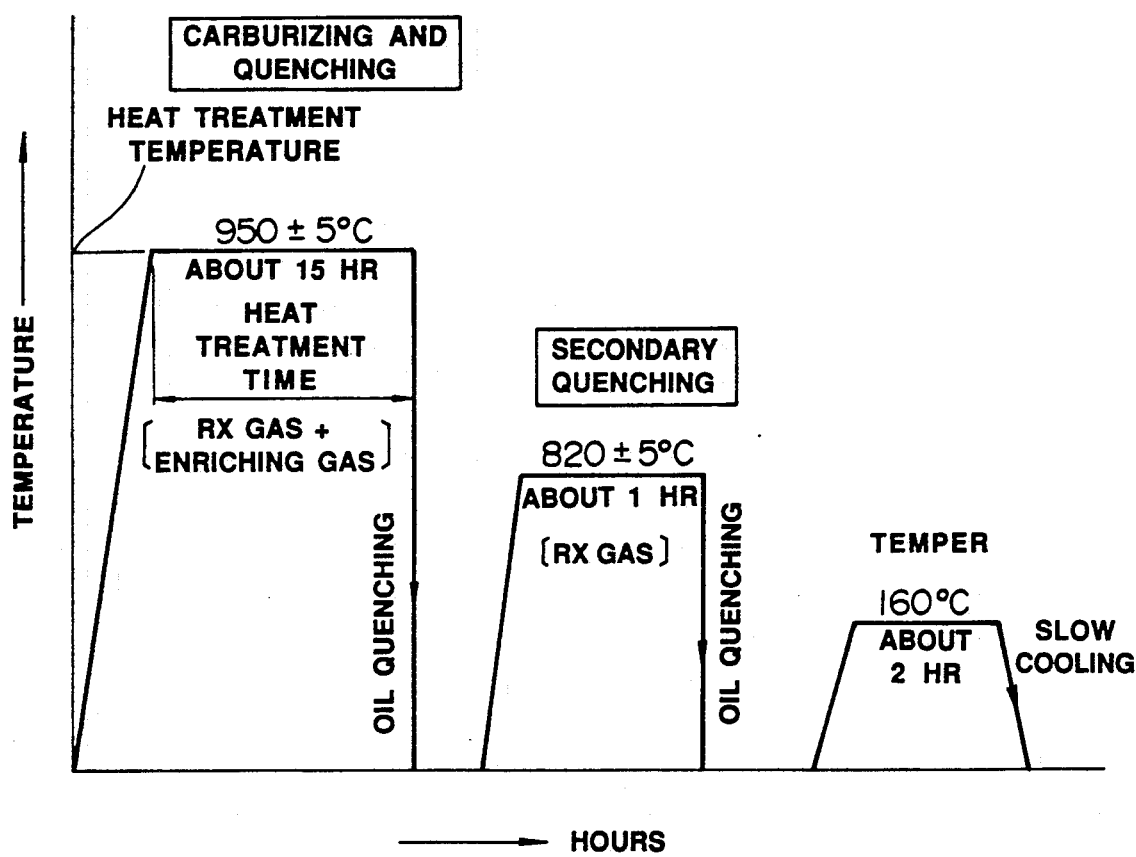
FIG. 5 is a graph illustrating a heat treatment of disc-shaped test pieces and tapered roller bearings of a second embodiment of the present invention.

FIG. 5 illustrates the heat treatment process including the steps of carburization, quenching and tempering. The disc-shaped test pieces, four row tapered roller bearing, double row tapered roller bearing and four row cylindrical roller bearing were carburized under the atmosphere of an RX gas plus an enriching gas at about 950° C.+5° C. for about 15 hours, then oil quenched, then again retained under the atmosphere of an RX gas at about 820° C.+5° C. for about one hour and then tempered at about 160° C. for about two hours. In-surface retained austenite content ($r_R$) of the disc-shaped test pieces, the tracks of the races and the rolling contact surfaces of the rolling elements was 35 vol %. The number of $Al_2O_3$ or $Al_2O_3$-base inclusion particles with a 3 μm or more average particle size was 56 for each tested area of 165 mm$^2$ of raw steel. On the other hand, the number of $Al_2O_3$ or $Al_2O_3$-base inclusion particles with a 13 μm or more average particle size was zero for the tested area. The rated life $L_{10}$ of the disc-shaped test pieces was 4.5×10$^5$ cycles so as to far exceed the 30 times the calculated life $L_{10}$cal. A steel-rolling test of 1,000 hours total rolling time was conducted so that the four row tapered roller bearing and double row tapered roller bearing were used with the upper working roll 1 and the four row cylindrical roller bearing was used with the support roll 21. The rolling mill of FIG. 6 executed a rolling operation so that the upper working roll 1 received a bending of a 100-550 mm curvature radius. Table 3 shows the rolling times and appearance check contents in the disassembly of the

TABLE 2

| Charge No. | Steel ingot producing process | Chemical composition I (C to Ti: in %; O: in ppm) | | | | | | | Number of $Al_2O_3$ or $Al_2O_3$-base inclusion particles with 3 μm or more average particle size | Presence or absence of $Al_2O_3$ or $Al_2O_3$-base inclusion particles with 13 μm or more average particle size | In-surface $r_R$ vol % | $L_{10}$ (cycles) |
|---|---|---|---|---|---|---|---|---|---|---|---|---|
| | | C | Si | Mn | P | S | Ti | O | | | | |
| 1 | VIM and then VAR | 0.42 | 0.26 | 1.52 | 0.018 | 0.007 | 0.003 | 8 | 62 | none | 31 | 2.1 × 10$^8$ |
| 2 | " | 0.40 | 0.26 | 1.48 | 0.015 | 0.008 | 0.002 | 7 | 56 | " | 28 | 4.2 × 10$^8$ |
| 3 | " | 0.41 | 0.25 | 1.49 | 0.014 | 0.005 | 0.003 | 8 | 42 | " | 30 | 5.1 × 10$^8$ |
| 4 | " | 0.40 | 0.26 | 1.50 | 0.019 | 0.006 | 0.001 | 5 | 48 | " | 12 | 6.0 × 10$^7$ |
| 5 | " | 0.43 | 0.24 | 1.47 | 0.018 | 0.006 | 0.004 | 8 | 54 | " | 67 | 5.4 × 10$^7$ |
| 6 | EF then LF and then RH | 0.40 | 0.25 | 1.50 | 0.015 | 0.007 | 0.003 | 8 | 180 | Present | 31 | 2.0 × 10$^7$ |
| 7 | " | 0.43 | 0.24 | 1.47 | 0.018 | 0.005 | 0.003 | 7 | 206 | " | 34 | 1.7 × 10$^7$ |
| 8 | " | 0.42 | 0.26 | 1.51 | 0.019 | 0.008 | 0.004 | 5 | 164 | none | 31 | 2.3 × 10$^7$ |
| 9 | " | 0.40 | 0.25 | 1.52 | 0.012 | 0.006 | 0.001 | 7 | 174 | present | 29 | 2.9 × 10$^7$ |
| 10 | " | 0.43 | 0.24 | 1.50 | 0.011 | 0.007 | 0.001 | 7 | 210 | " | 29 | 2.5 × 10$^7$ |

Embodiment 2

A raw steel of a composition set forth in Table 2 was produced in the sequence of VIM and VAR. Disc-shaped test pieces which had been made of a part of this raw steel were subjected to a life test in the same manner as in Embodiment 1. A four row tapered roller inventive rolling bearings and the prior-art rolling bearings. In these steel-rolling operations, the inventive rolling bearings experienced no flaking and no failure due to an excessive temperature rise in the rolling bearings temperature rise in the roll neck of the upper working roll 1 or a temperature rise in a bearing grease.

TABLE 2

| C | Si | Mn | P | S | Cu | Ni | Cr | Mo | Ti | O |
|---|---|---|---|---|---|---|---|---|---|---|
| 0.20 | 0.27 | 0.65 | 0.005 | 0.008 | 0.01 | 2.27 | 0.74 | 0.33 | 0.002 | 5 |

C to Ti: in %; O: in ppm.

TABLE 3

Comparison of Inventive Steel with Prior-art Steel

| | Steel-rolling time | Appearance check contents in disassemblage |
|---|---|---|
| Inventive steel | 1,000 hr | The track surfaces of the inner and outer races and rolling contact surfaces of the rollers of the roller bearings experienced no flaking so that the rolling bearings were in good order. |
| Prior-art steel | 280 hr | The track surface of the outer race of one of the roller bearings experienced a flaking so as to cause the track surface of the inner race and the rolling contact surfaces of the rollers of the one roller bearing to experience a large number of impressions, i.e., a surface roughening. |

What is claimed is:

1. A rolling bearing, wherein at least one of the races and the rolling element of the rolling bearing is made of a raw steel which is free from a $Al_2O_3$ or $Al_2O_3$-base inclusion particle with a 13 μm or more average particle size; but which includes 1 to 80 $Al_2O_3$ or $Al_2O_3$-base inclusion particles with a 3 μm or more average particle size for each tested area of 165 mm² of the raw steel.

2. The rolling bearing as recited in claim 1 wherein the raw steel includes a composition of impurities comprising P: 0.020 wt % or less; S: 0.008 wt % or less; and Ti: 0.004 wt % or less.

3. The rolling bearing as recited in claim 2 wherein the content of retained austenite present in the surface of one of the races and the rolling element of the rolling bearing is 20-45 vol %.

4. The rolling bearing as recited in claim 3 for with a hot-rolling working roll with a 400 mm or less diameter.

5. The rolling bearing as recited in claim 4 for with a hot-rolling working roll so that a horizontal bending apparatus applies a horizontal bending to the trunk of the hot-rolling working roll.

6. The rolling bearing as recited in claim 2 for with a hot-rolling working roll with a 400 mm or less diameter.

7. The rolling bearing as recited in claim 6 for with a hot-rolling working roll so that a horizontal bending apparatus applies a horizontal bending to the trunk of the hot-rolling working roll.

8. The rolling bearing as recited in claim 3 for with a hot-rolling working roll so that a horizontal bending apparatus applies a horizontal bending to the trunk of the hot-rolling working roll.

9. The rolling bearing as recited in claim 2 for with a hot-rolling working roll so that a horizontal bending apparatus applies a horizontal bending to the trunk of the hot-rolling working roll.

10. The rolling bearing as recited in claim 1 wherein the content of retained austenite present in the surface of one of the races and the rolling element of the rolling bearing is 20-45 vol %.

11. The rolling bearing as recited in claim 10 for with a hot-rolling working roll so that a horizontal bending apparatus applies a horizontal bending to the trunk of the hot-rolling working roll.

12. The rolling bearing as recited in claim 10 for with a hot-rolling working roll with a 400 mm or less diameter.

13. The rolling bearing as recited in claim 12 for with a hot-rolling working roll so that a horizontal bending apparatus applies a horizontal bending to the trunk of the hot-rolling working roll.

14. The rolling bearing as recited in claim 1 for with a hot-rolling working roll with a 400 mm or less diameter.

15. The rolling bearing as recited in claim 14 for with a hot-rolling working roll so that a horizontal bending apparatus applies a horizontal bending to the trunk of the hot-rolling working roll.

16. The rolling bearing as recited in claim 1 for with a hot-rolling working roll so that a horizontal bending apparatus applies a horizontal bending to the trunk of the hot-rolling working roll.

* * * * *